United States Patent
Nesci et al.

(10) Patent No.: US 9,138,107 B2
(45) Date of Patent: Sep. 22, 2015

(54) SPICE RACK

(75) Inventors: Julian Nesci, Piara Waters (AU);
Suzanne Nesci, Piara Waters (AU);
Edward Joseph Khoury, Bateman (AU)

(73) Assignee: Development Support System PTY Ltd., Piara Waters (AU)

( * ) Notice: Subject to any disclaimer, the term of this patent is extended or adjusted under 35 U.S.C. 154(b) by 344 days.

(21) Appl. No.: 13/641,718

(22) PCT Filed: Apr. 14, 2011

(86) PCT No.: PCT/AU2011/000411
§ 371 (c)(1),
(2), (4) Date: Oct. 17, 2012

(87) PCT Pub. No.: WO2011/130776
PCT Pub. Date: Oct. 27, 2011

(65) Prior Publication Data
US 2013/0038184 A1 Feb. 14, 2013

(30) Foreign Application Priority Data
Apr. 19, 2010 (AU) ................................ 2010901620

(51) Int. Cl.
*G07F 11/62* (2006.01)
*A47J 47/04* (2006.01)

(52) U.S. Cl.
CPC *A47J 47/04* (2013.01); *G07F 11/62* (2013.01)

(58) Field of Classification Search
CPC ........... A47J 47/04; A47J 47/16; G07F 11/60; G07F 11/62
USPC ................... 221/122, 126; 700/232, 236, 240
See application file for complete search history.

(56) References Cited

U.S. PATENT DOCUMENTS

| | | | | |
|---|---|---|---|---|
| 844,840 | A * | 2/1907 | West | 366/276 |
| 4,234,869 | A * | 11/1980 | Sandelman | 340/8.1 |
| 5,024,318 | A | 6/1991 | Schwarze et al. | |
| 5,724,764 | A * | 3/1998 | Alsup | 220/525 |
| 6,502,718 | B2 * | 1/2003 | Fitzgerald et al. | 221/131 |
| 8,068,932 | B2 * | 11/2011 | Kirzinger | 700/237 |
| 8,103,379 | B2 * | 1/2012 | Biba et al. | 700/232 |
| 2002/0125265 | A1 | 9/2002 | Burggraf | |

FOREIGN PATENT DOCUMENTS

DE 202004015382 U1 1/2005

OTHER PUBLICATIONS

PCT International Search Report for Application No. PCT/AU2011/000411 filed on Apr. 14, 2011 which is a counterpart of U.S. Appl. No. 13/641,718.
PCT International Written Opinion for Application No. PCT/AU2011/000411 filed on Apr. 14, 2011 which is a counterpart of U.S. Appl. No. 13/641,718.

* cited by examiner

*Primary Examiner* — Timothy Waggoner
(74) *Attorney, Agent, or Firm* — Warner Norcross & Judd LLP (57) ABSTRACT

A spice rack comprising a housing and receptacles for holding spices. The receptacle holders are provided within the housing for receiving one of the receptacles. A selector is provided so that when selecting one of the receptacle holders from the selector, the selector moves a moveable access opening to be adjacent to the selected receptacle holder so that the receptacle in the selected receptacle holder can be removed from the housing.

21 Claims, 12 Drawing Sheets

SPICE RACK

FIELD OF THE INVENTION

The present invention relates to a spice rack.

BACKGROUND TO THE INVENTION

Spice racks are commonly used for storing a selection of spices for cooking. Known spice racks generally comprise a simple frame for receiving a number of jars, each jar holding a particular spice.

When looking for a particular spice to be used, it is usual to scan the labels of all of the jars looking for the one required. In a spice rack holding a large number of different spices, the location of the required spice is often not immediately apparent, particularly if the jars of spice have not been placed in the rack in any particular order.

The present invention relates to an improved spice rack including features for aiding the storage and location of spices contained in the rack.

SUMMARY OF THE INVENTION

According to one aspect of the present invention there is provided a spice rack comprising:
a housing;
a plurality of receptacles for holding spices;
a plurality of receptacle holders within the housing each for receiving one of the receptacles;
a moveable access opening; and
a selector;
wherein the selector is used to select one of the receptacle holders and the moveable access opening moves to be adjacent the selected receptacle holder such that the receptacle in the selected receptacle holder can be removed from the housing.

Preferably the spice rack further comprises:
a receptacle identifier provided on each of the receptacles;
a reader associated with each receptacle holder for reading the identifier of a receptacle within the receptacle holder; and
a memory containing a list of spices, each receptacle identifier being associated in memory with one of said spices;
wherein when a receptacle is received in one of the receptacle holders the receptacle identifier is stored in memory associated with a receptacle holder identifier to identify the receptacle holder in which the receptacle has been received and selecting a spice from the list of spices on the selector causes the access opening to move adjacent the receptacle holder containing the receptacle associated with said selected spice.

In a preferred embodiment, the access opening is provided on a belt driveable by a drive motor such that the access opening aligns with one of the receptacle holders.

Preferably the housing includes an aperture in a front panel thereof and a portion of the belt is located adjacent the aperture such that the access opening is moveable to be aligned with one of the receptacle holders to allow the receptacle in that receptacle holder to be removed through the aperture.

The access opening is preferably moveable to be either aligned with the first end of one of the receptacle holders or to be out of alignment with the elongate aperture such that none of the receptacles is accessible.

In one embodiment, the aperture comprises an elongate aperture and the receptacle holders are arranged side by side within the housing such that the first ends thereof are all located adjacent the elongate aperture.

Preferably receptacles are received in the receptacle holders by sliding such that an upper end of the receptacle is located adjacent the first end of the receptacle holder and a lower end of the receptacle is located adjacent a second end of the receptacle holder remote from the first end.

In a preferred embodiment, the selector includes a display panel on which is displayed the list of spices available in the receptacles currently stored in the spice rack.

A communication port is preferably provided such that the spice rack can be connected to further spice racks via the communication port and one of the control panels may be used to select receptacles stored in any of the spice racks.

In one embodiment, the housing comprises a rectangular prism having an upper wall, a lower wall, a front wall, a rear wall and first and second side walls and the belt extends around the interior of the housing adjacent the front and rear walls and the first and second side walls.

In a preferred embodiment, the receptacle holders each comprises a frame having a pair of rails on opposed longitudinal such that a side of the receptacle is slid between the rails until the lower end of the receptacle is adjacent an end stop provided adjacent the second end of the frame.

The receptacle holders each preferably include an engagement mechanism to hold the receptacle when the receptacle is received into the receptacle holder.

In one embodiment, the receptacle holder further comprises:
an engagement clip extending from the end stop including a resilient member to press against the end of the receptacle;
a lug provided on the engagement clip to engage with a corresponding recess in a lower end of the receptacle; and
a tab adjacent the first end of the frame;
wherein when the receptacle is inserted into the receptacle holder, the upper end of the receptacle is depressed downwardly to engage behind the tab adjacent the first end of the frame and pushing the upper end upwards to disengage it from the tab also disengages the lug from the recess in the lower end of the receptacle such that resilient member pushes the receptacle away from the end stop to protrude from the housing.

A bar member may provided including a plurality of engagement tabs located above each of the receptacle holders such that the engagement tabs engage with side surfaces of the receptacles on sides opposite the frame to aid in holding the receptacles in place in the receptacle holders.

Preferably one or more recipes lists are stored in memory, each recipe lists containing a list of the spices required for a particular recipe such that selection of the recipe list from the selector causes the access opening to move sequentially to be adjacent each of the receptacles containing spices from the recipe list.

Preferably a sensing device is provided adjacent each receptacle holder such that the sensing device can detect the level of spice contained within the receptacle in the receptacle holder.

In one embodiment, the sensing device comprises an emitter located on one side of the receptacle to direct a light beam through the receptacle and a light receiver on an opposite side of the receptacle positioned to receive the light beam.

BRIEF DESCRIPTION OF THE DRAWINGS

The invention will now be described, by way of example, with reference to the following drawings in which.

DETAILED DESCRIPTION OF PREFERRED EMBODIMENTS

Referring to the Figures, there is shown a spice rack 10 for storing spices contained in a plurality of receptacles 12. The spice rack 10 comprises a housing 14 including a plurality of receptacle holders 16, each being for receiving one of the receptacles 12.

The housing 14 is provided in the shape of a rectangular prism having an upper wall 18, a lower wall 19, a front wall 20, a rear wall 21 and first and second side walls 22 and 23. The housing 14 comprises a base member 24, a top cover 25 and a front panel 26. The base member 24 includes the lower wall 19 and the rear wall 21. The top cover 25 includes the upper wall 18 and the first and second side walls 22 and 23. The front panel 26 comprises the front wall 20 of the housing 14.

A mounting bracket 27 is also provided for mounting the spice rack 10. The mounting bracket 27 is securable to the underside of a horizontal surface and engages with the top cover 25 to support the spice rack 10. The mounting bracket 27 may be secured, for example, to the underside of wall mounted cupboards commonly found in kitchens so that the spice rack 10 is secured about a kitchen countertop.

Figure 6A:
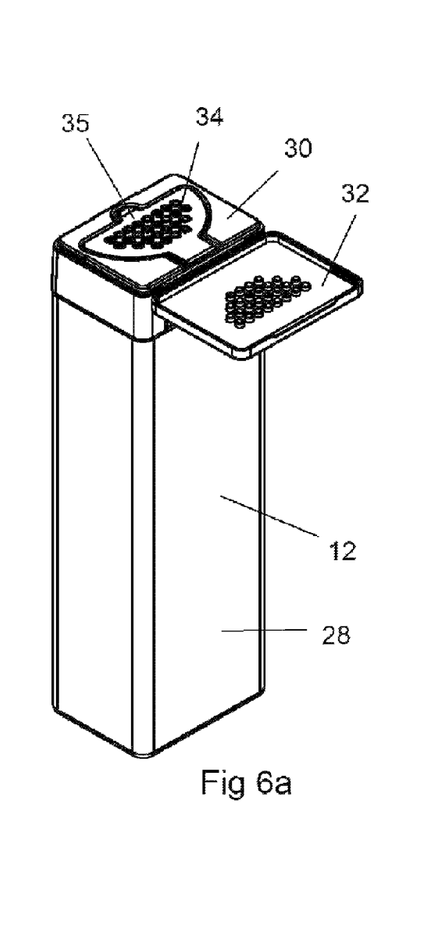
FIG. 6a is an upper perspective view of a receptacle of the spice rack with the lid in a first open position.
Figure 6B:
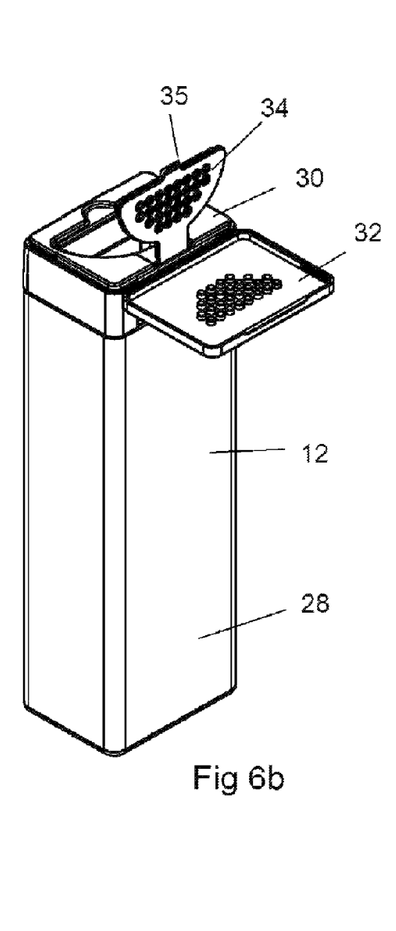
FIG. 6b is an upper perspective view of a receptacle of the spice rack with the lid in a second open position.
Figure 6C:
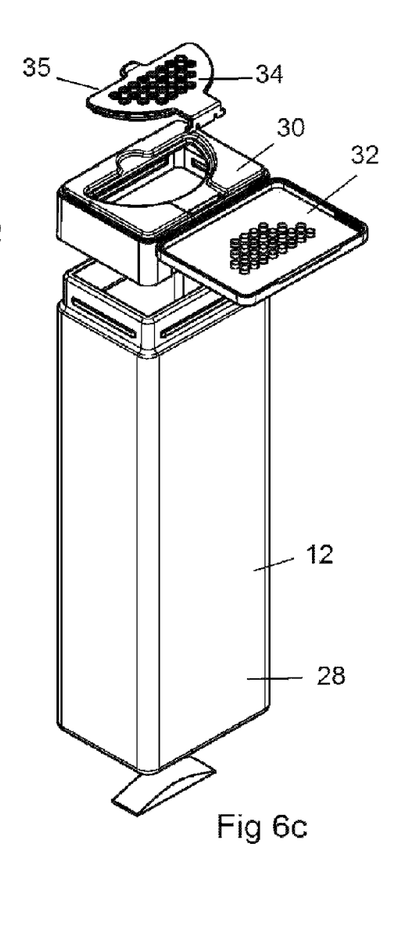
FIG. 6c is an upper perspective view of a receptacle of the spice rack with the lid removed.
Figure 7:
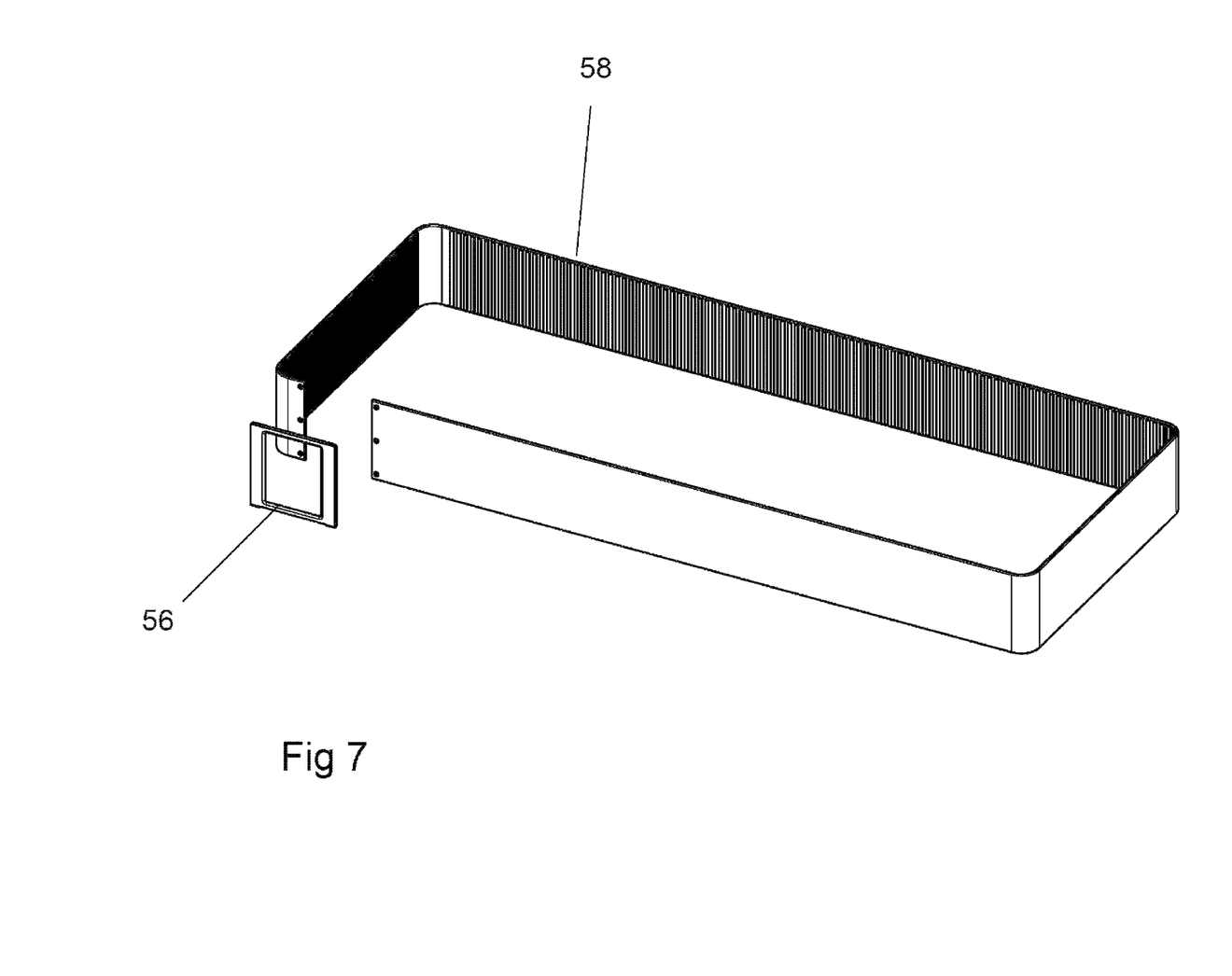
FIG. 7 is an upper perspective view of the belt of the spice rack of FIG. 1.
Figure 8:
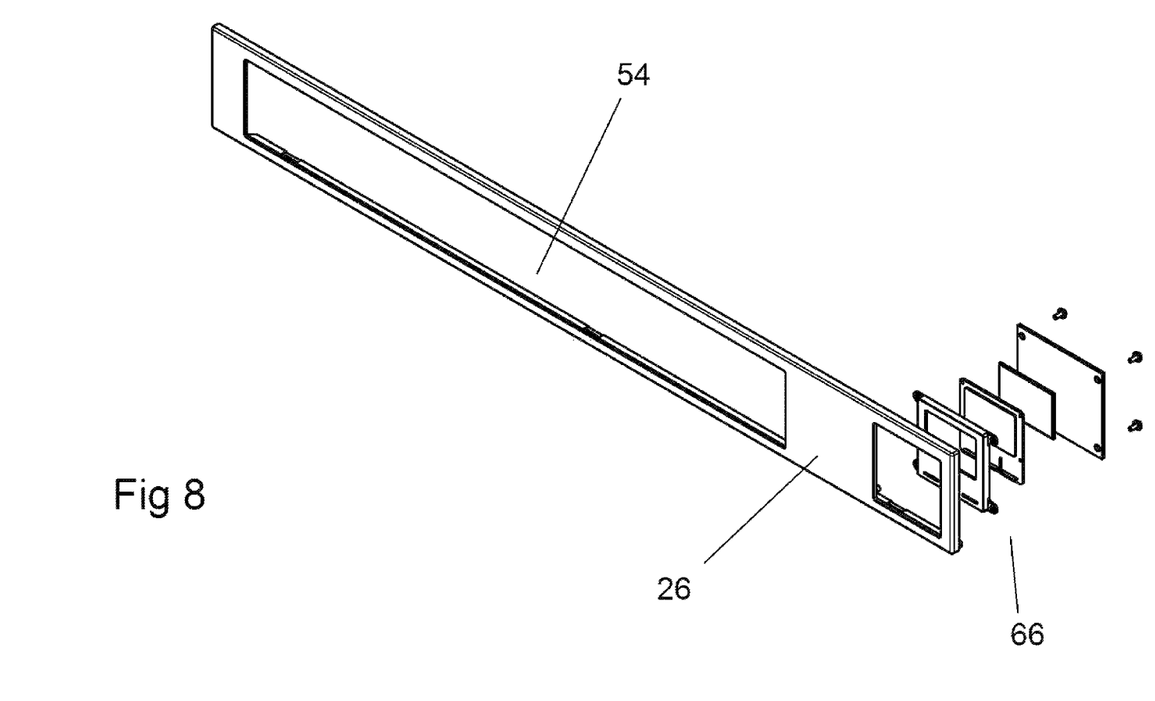
FIG. 8 is an upper perspective view of the front panel of the spice rack of FIG. 1.

Each of the receptacles 12 comprises a body 28 and a cap 30 (as seen in FIG. 6). In the embodiment shown, the receptacles 12 are provided in a rectangular prism shape with the cap 30 on a longitudinal end thereof. The caps 30 each include a pivotable lid 32 that can be pivoted to cover a plurality of holes 34 in the cap 30. The lid 32 can therefore be pivoted to an open position in order for the spices to be shaken from the holes 34 in a known manner. The holes 34 may further be provided in a pivotable portion 35 that can be opened (as shown in FIG. 6b) to provide a larger opening through which the spice can be accessed.

Figure 11:
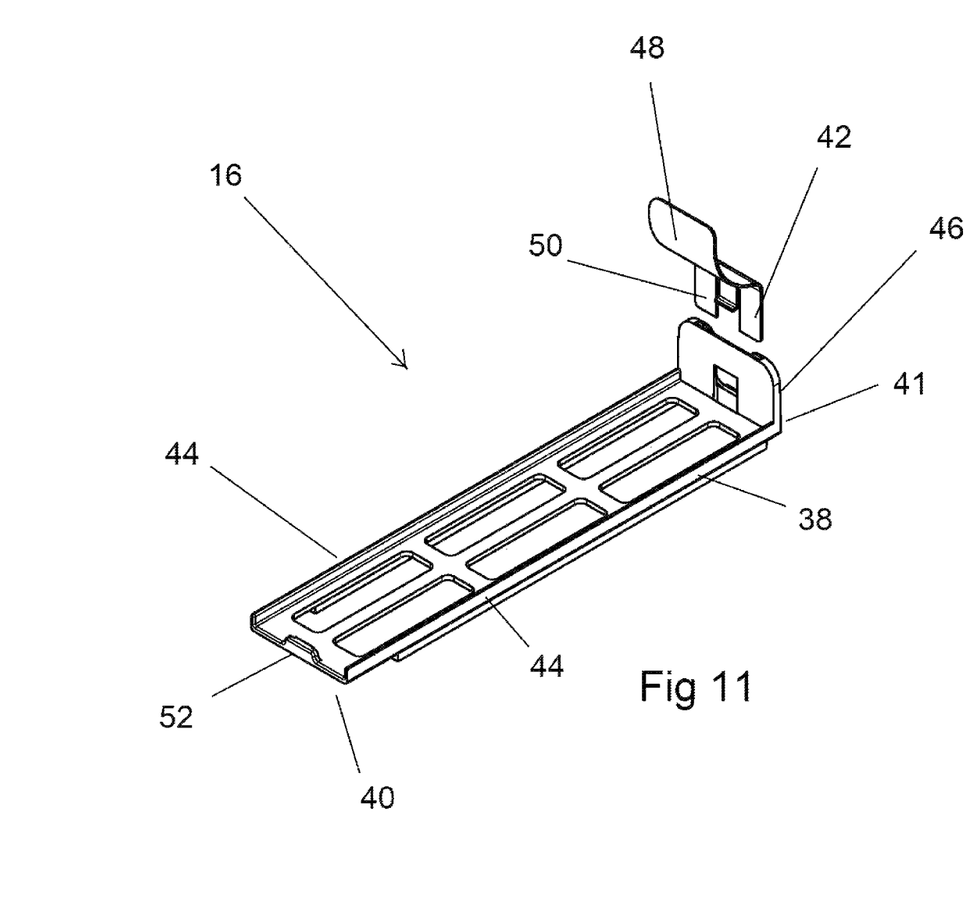
FIG. 11 is an upper perspective view of a receptacle holder of the spice rack of FIG. 1.
Figure 12:
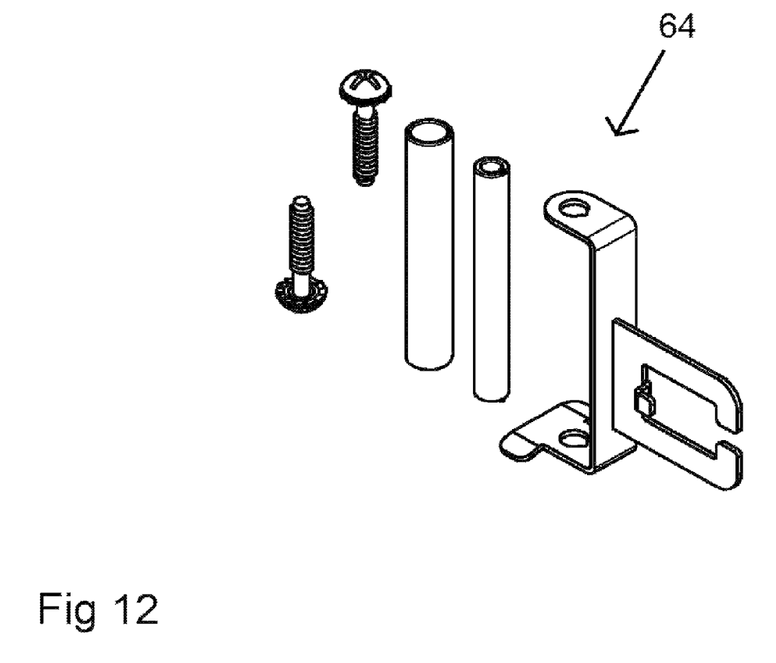
FIG. 12 is an exploded view of the belt tensioner of the spice rack of FIG. 1.

Each of the receptacle holders 16 comprises a frame 38 (as shown in FIG. 11) for receiving a single receptacle 12. Each frame 38 is provided such that a receptacle 12 can be slid longitudinally into the frame from a first end 40 thereof towards a second end 41 thereof. The receptacle 12 is slid into the frame 38 with the lower end (being the end opposite the cap 30) first. Each frame 38 comprises a rectangular plate having a pair of rails 44 on opposed longitudinal sides. A side of the receptacle 12 is slid between the rails 44 until the lower end of the receptacle is adjacent an end stop 46 provided adjacent the second end 41 of the frame 38.

The receptacle holder 16 includes an engagement mechanism to hold the receptacle 12 when the receptacle is slid into the receptacle holder 16. The receptacle holder 16 in the embodiment shown includes an engagement clip 42 adjacent the second end 41. The engagement clip 42 is provided extending from the end stop 46 and includes a resilient member 48 to press against the end of the receptacle 12. A lug 50 is also provided to engage with a corresponding recess in a lower end of the receptacle 12 such that the lug 50 engages with the recess to hold the receptacle in the frame 38.

When the receptacle 12 is inserted into the receptacle holder 16, the upper end of the receptacle 12 is also depressed downwardly to engage behind a tab 52 adjacent the first end 40 of the frame 38. The receptacle 12 can be removed by pushing the upper end upwards to disengage it from the tab 52. This motion also disengages the lug 50 from the recess in the lower end of the receptacle 12. The resilient member 48 then flexes back and pushes the receptacle away from the end stop 46 such that the upper end thereof protrudes from the housing 14 so it may be grasped and removed.

Figure 9:
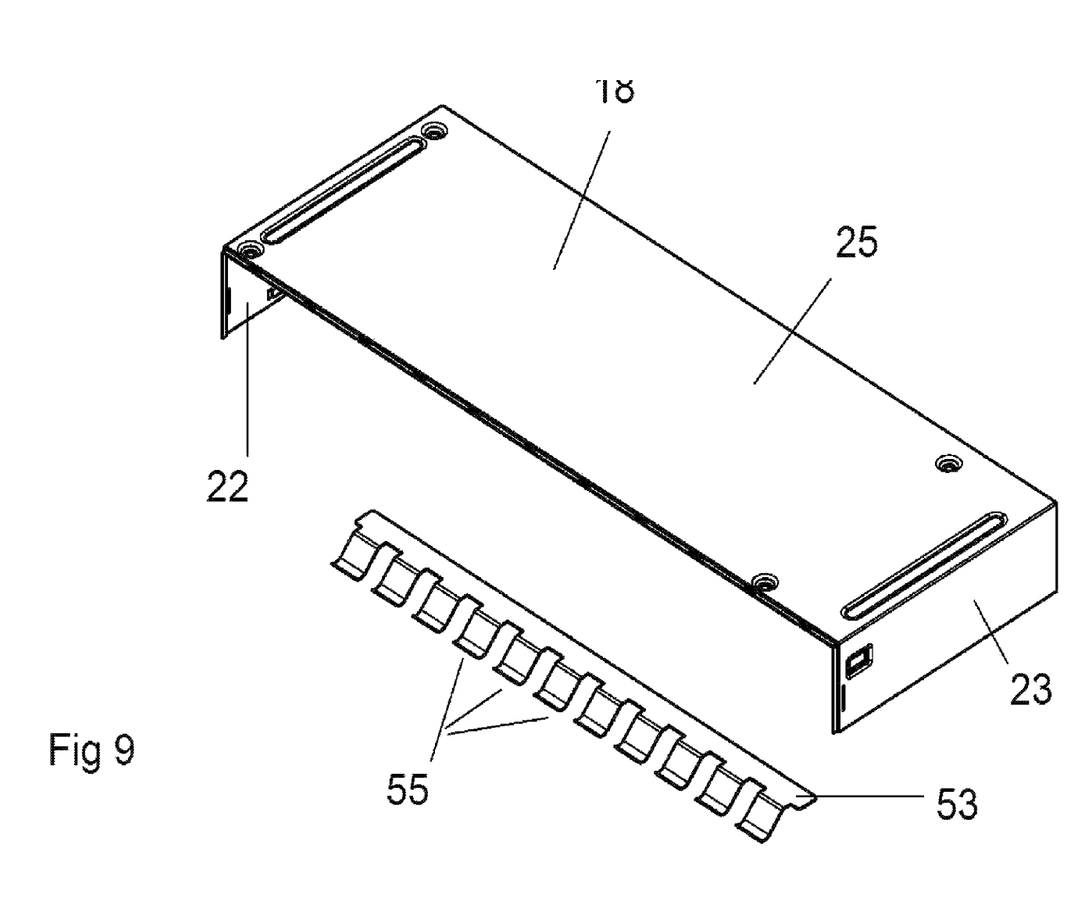
FIG. 9 is an upper perspective view of the top cover of the spice rack of FIG. 1.
Figure 10:
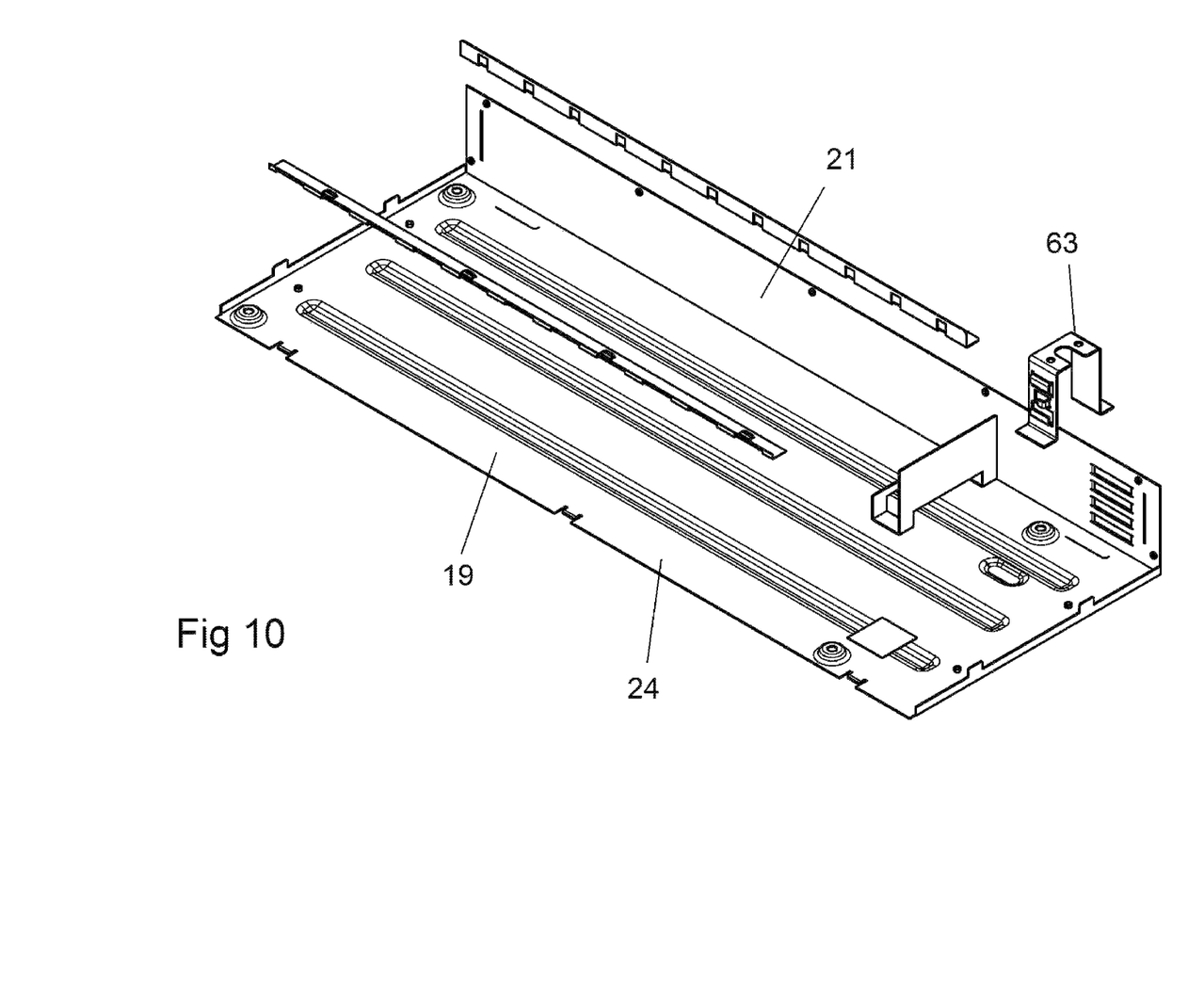
FIG. 10 is an upper perspective view of the base member of the spice rack of FIG. 1.

A bar member 53 (as seen in FIG. 9) is also provided connected to the top cover 25. The bar member 53 includes a plurality of engagement tabs 55 located above each of the receptacle holders 16 such that the engagement tabs 55 engage with side surfaces of the receptacles 12 on sides opposite the frame 38 to aid in holding the receptacles 12 in place in the receptacle holders 16.

The receptacle holders 16 are arranged side by side within the housing 14 such that the first ends 40 thereof are all located adjacent the front panel 26. The front panel 26 includes also an elongate aperture 54 adjacent the first ends 40 of the receptacle holders 16 such that receptacles 12 can be inserted into and removed from the receptacle holders 16 via the aperture 54.

The housing 14 is provided with a moveable member having an access opening 56. The moveable member is moveable such that the access opening 56 can be located adjacent the first end 40 of any of the receptacle holders 16. The receptacle 12 provided within that receptacle holder 16 can then be removed through the access opening 56 while access to all other receptacle holders 16 is blocked by the moveable member.

The moveable member comprises a belt 58. The belt 58 extends around rollers 60 provided adjacent each corner of the base member 24, extending upwardly therefrom. The belt 58 thereby extends around the interior of the housing 14 adjacent the front and rear walls 20 and 21 and the first and second side walls 22 and 23. A portion of the belt 58 therefore extends adjacent and behind the front panel 26 across the elongate aperture 54.

Figure 1:
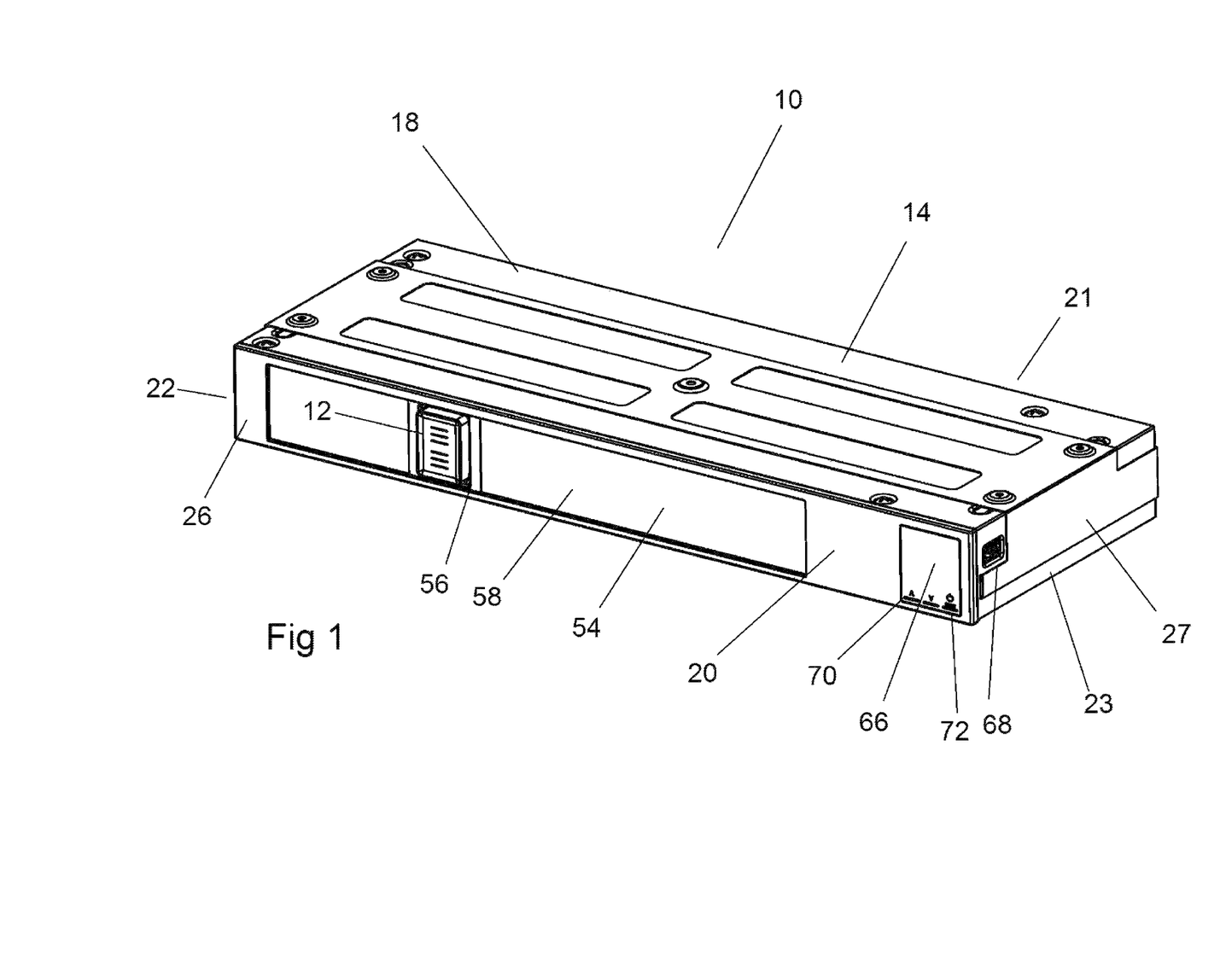
FIG. 1 is an upper perspective view of a spice rack in accordance with the present invention.
Figure 2:
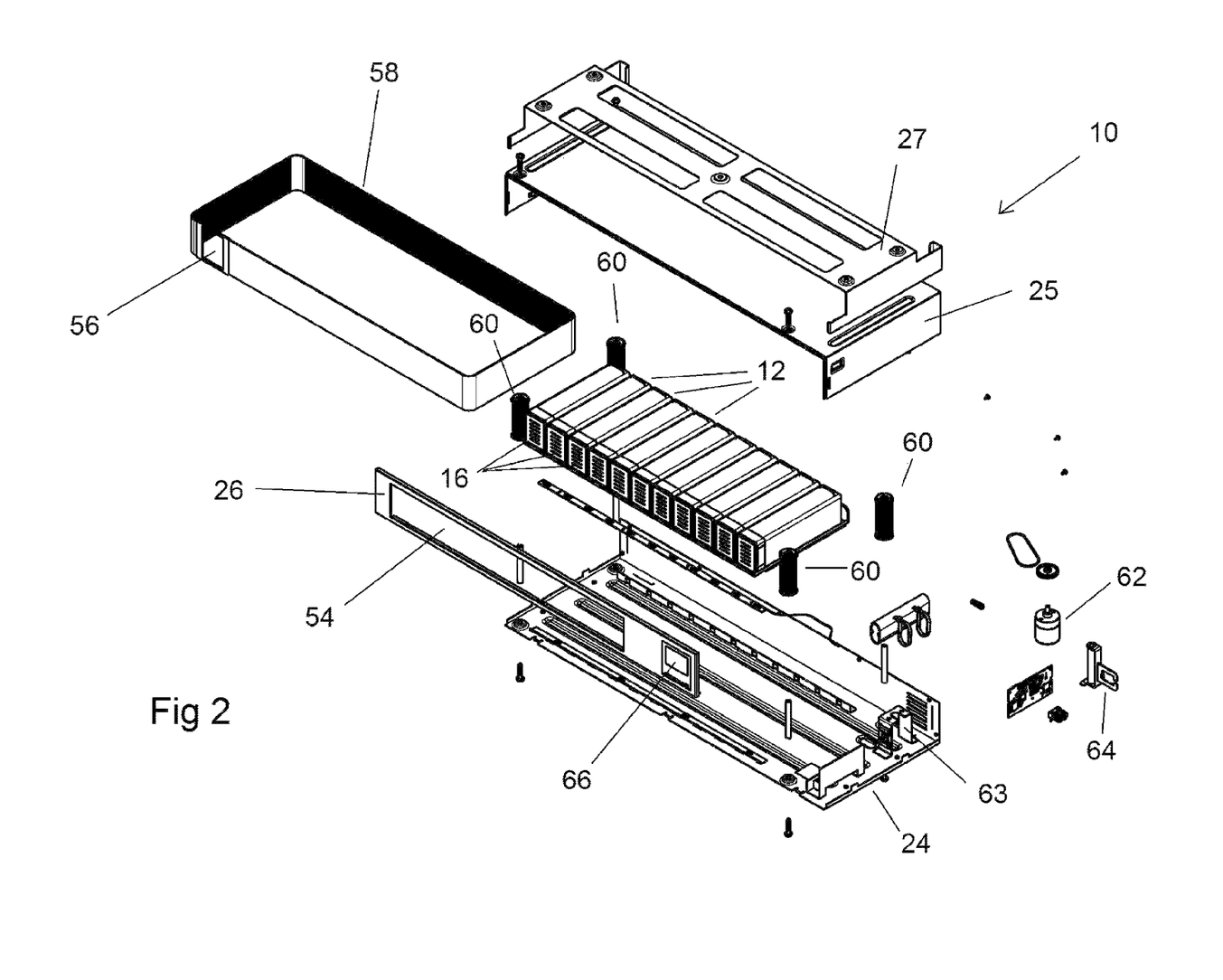
FIG. 2 is an exploded view of the spice rack of FIG. 1.
Figure 3:
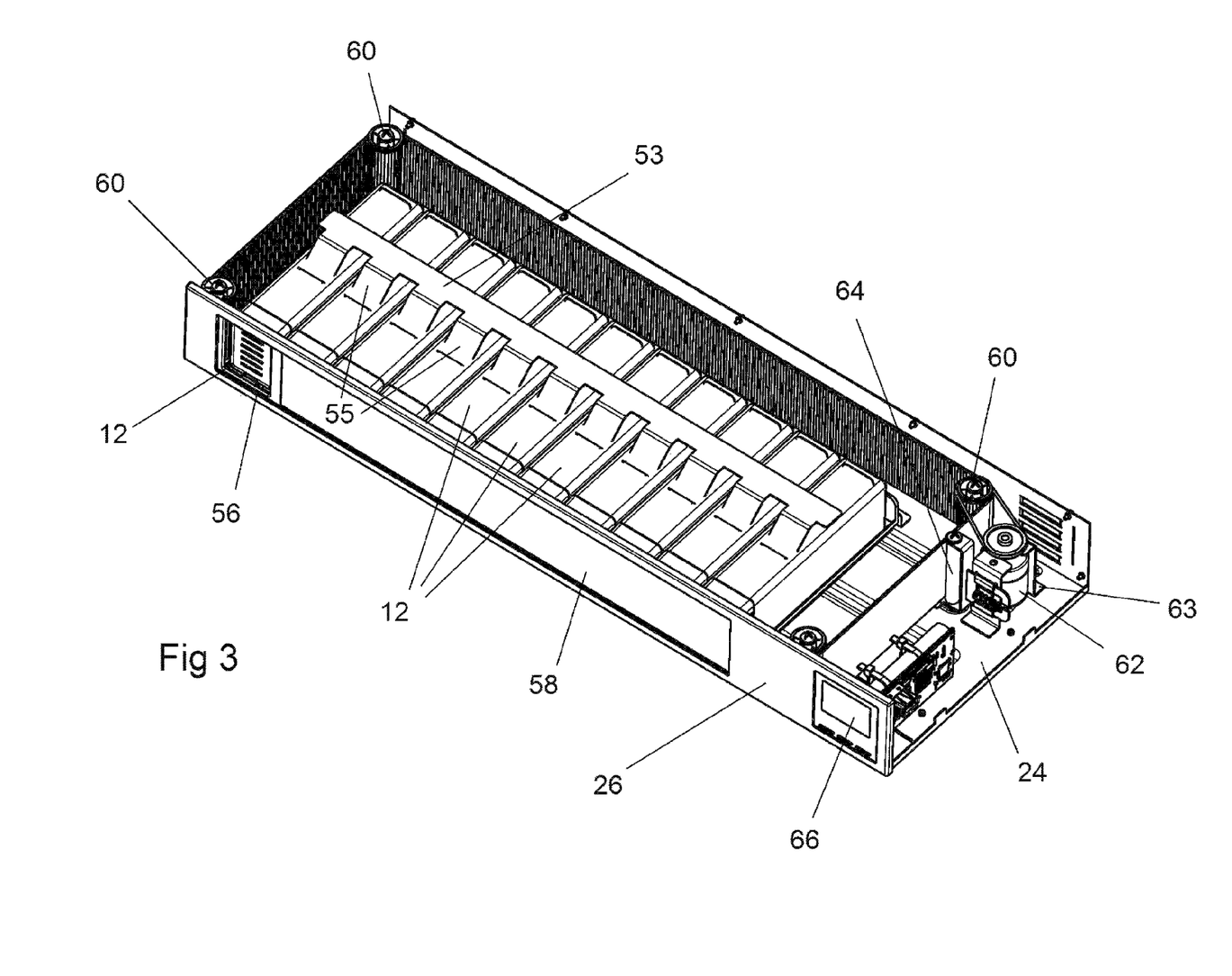
FIG. 3 is an upper perspective view of the spice rack of FIG. 1 with the top cover removed.
Figure 4A:
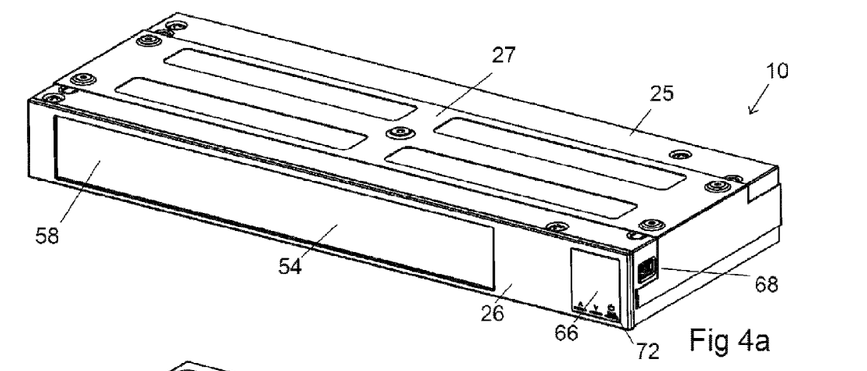
FIG. 4a is a view of the spice rack of FIG. 1 with the access opening moved to a fully closed configuration.
Figure 4B:
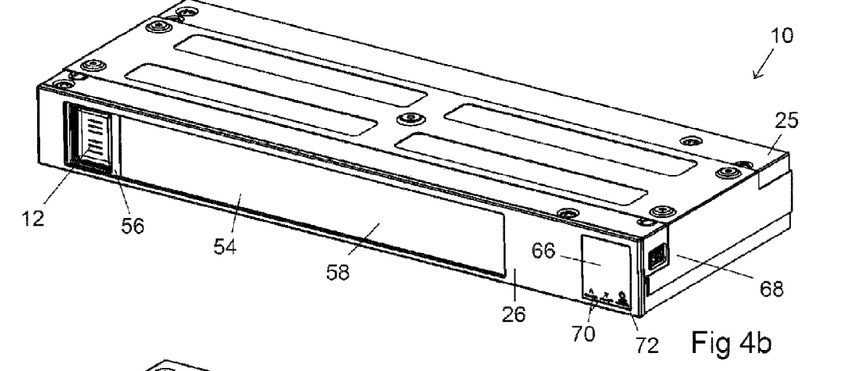
FIG. 4b is a view of the spice rack of FIG. 1 with the access opening moved to a first position.
Figure 4C:
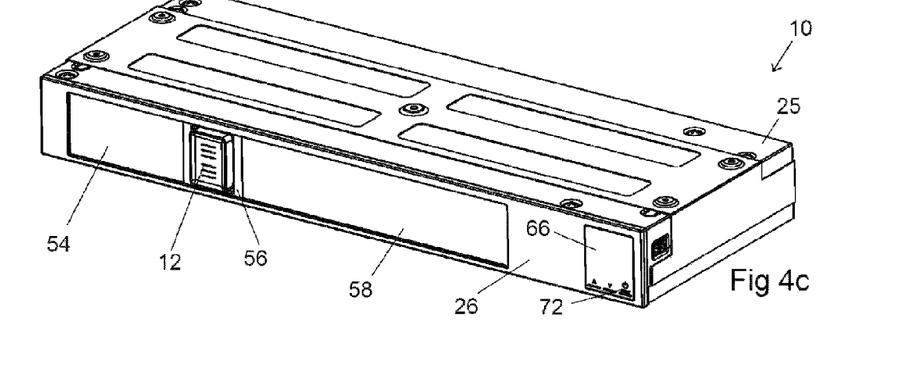
FIG. 4c is a view of the spice rack of FIG. 1 with the access opening moved to a second position.

The access opening 56 is moveable by driving of the belt 58 to move around the rollers 60. The access opening 56 is moveable to be aligned with the first end 40 of any of the receptacle holders 16 (as shown in FIGS. 4b and 4c) or to be out of alignment with the elongate aperture 54 (as shown in FIG. 4a) such that none of the receptacles 12 is accessible. The belt 58 is moveable by means of a drive motor 62 provided to engage with the belt 58 so that the belt 58 can be driven in either direction around the rollers 60 by operation of the drive motor 62. The drive motor 62 is secured in a motor mounting 63 secured to the base member 24. A belt tensioner 64 is also provided to engage with the belt 58 and maintain the belt 58 under the appropriate tension.

The spice rack 10 is provided with a selector in communication with the drive motor 62. The selector is provided to control movement of the belt 58 such that a particular receptacle holder 16 can be selected and the belt 58 is driven to align the access opening 56 with the selected receptacle holder 16. The selector is provided via an electronic control panel 66 and associated control circuitry connecting the control panel 66 and the drive motor 62.

Each of the receptacles 12 includes also a unique receptacle identifier. The receptacle identifier may comprise for example a bar code, chip or physical feature provided adjacent the lower end. Each of the receptacle holders 16 includes a reader such that when a receptacle 12 is inserted into the receptacle holder 16, the reader can read the receptacle identifier on the receptacle 12. Each of the receptacle holders 16 also includes a receptacle holder identifier.

The control circuitry includes a memory and is in communication with each of the receptacle holders 16 such that when a receptacle 12 is inserted into a receptacle holder 16, the control circuitry stores in memory the receptacle identifier of the receptacle 12 and the receptacle holder identifier of the receptacle holder 16 in which it is currently held. In this way, any receptacle 12 can be placed in any receptacle holder 16 and the locations of each receptacle 12 are stored in the memory. The selector can therefore be operated by selecting the receptacle 12 to be accessed rather than its location.

Also provided is a stored list of spices in the memory and any of the spices from the stored list can be associated with the receptacle identifier of a particular receptacle 12. The stored list is preferably pre-loaded but may also be added to by connecting the spice rack 10 to an external data source via a data port 68. A program function is provided via the control panel 66 wherein each receptacle 12 (identified by its unique receptacle identifier) can be associated with a particular spice from the stored list. For example, a receptacle 12 can be placed within a receptacle holder 16 and the program function activated by pressing a button provided on the control panel 66. The spices on the stored list are displayed on the control panel 66 and the spice currently stored in that receptacle 12 is then selected. In this way, the spice currently stored in each receptacle 12 in the spice rack 10 is known.

The selector therefore comprises a list of the spices displayed on the control panel 66. The list of spices can be scrolled through by scroll buttons 70. The spices may be displayed in alphabetical order. Alternatively, spices used more frequently may be displayed first. A select button 72 can then be used to select a required one of said spices. The spice rack 10 has stored in memory the receptacle identifier of the receptacle 12 in which that spice is contained and knows also the receptacle holder 16 in which that receptacle 12 is located by the receptacle holder identifier stored in memory associated with that receptacle identifier. The belt 58 can therefore be driven such that the access opening 56 is located adjacent that receptacle 12. That is, a required spice is selected and the belt 58 moves into the correct position to access the receptacle 12 that holds the spice.

The spice rack 10 may also store in memory one or more recipes lists. Each recipe lists contains a list of the spices required for a particular recipe. The recipe list may be selected from the selector and the access opening 56 will then move sequentially to be adjacent each of the receptacles 12 containing spices from the recipe list. That is, each time a receptacle 12 is removed containing one of the spices from the recipe list, the access opening then moves to be adjacent the receptacle 12 containing the next spice on the recipe list.

The spice rack 10 is preferably provided with a sensing device adjacent each receptacle holder 16 such that the sensing device can detect the level of spice contained within the receptacle 12 in the receptacle holder 16. The sensing device may comprise for example an emitter located on one side of the receptacle 12 to direct a light beam through to a light receiver on an opposite side of the receptacle 12. By positioning the light emitter and receivers in appropriate positions, the emitter will receive a signal when the level of spice has dropped below a predetermined volume. The sensing devices are in communication with the display panel so that an indication may be provided that a particular spice is low and requires refilling.

Figure 5:
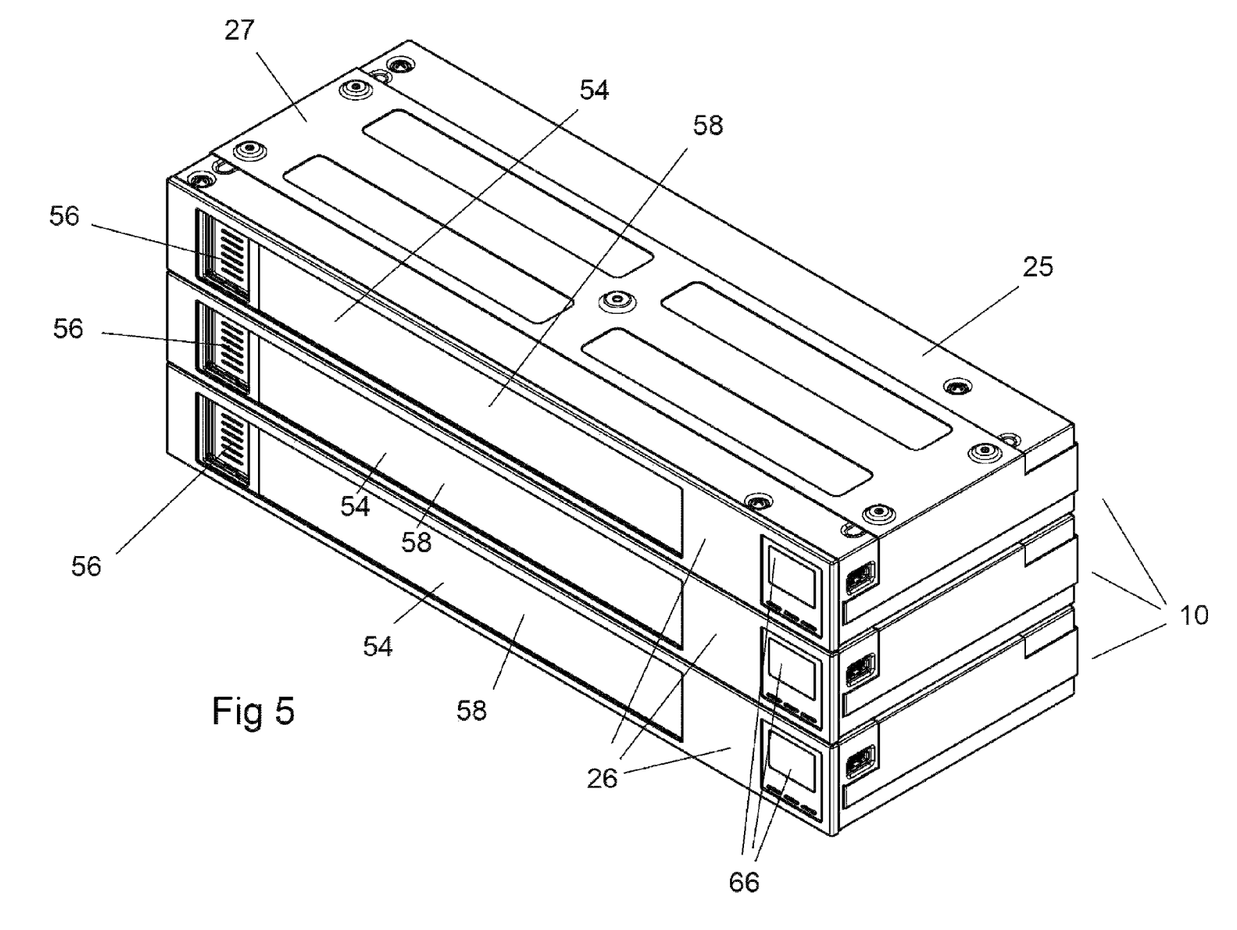
FIG. 5 is an upper perspective view of three spice racks in a stacked configuration.

The spice rack 10 includes a communication port 68 such that each spice rack 10 can be connected to further spice racks 10. As shown in FIG. 5, multiple spice racks 10 may be secured together in a modular fashion. The communication ports allow connection of adjacent spice racks 10 such that one of the control panels 66 may be used to select receptacles 12 stored in any of the spice racks 10 by selection of the appropriate spice. Multiple spice racks 10 may therefore be connected in a modular fashion to provide any required number of receptacles 12 for holding spices.

It will be readily apparent to persons skilled in the relevant arts that various modifications and improvements may be made to the foregoing embodiments, in addition to those already described, without departing from the basic inventive concepts of the present invention.

The invention claimed is:

1. A spice rack comprising:
   a housing;
   a plurality of receptacles for holding spices;
   a plurality of receptacle holders within the housing each for receiving one of the receptacles;
   a selector;
   a receptacle identifier provided on each of the receptacles;
   a reader associated with each receptacle holder for reading the identifier of a receptacle within the receptacle holder; and
   a memory containing a list of spices, each receptacle identifier being associated in memory with one of said spices;
   wherein when a receptacle is received in one of the receptacle holders the receptacle identifier is stored in memory associated with a receptacle holder identifier to identify the receptacle holder in which the receptacle has been received and selecting a spice from the list of spices on the selector causes operation of the spice rack such that the receptacle holder containing the receptacle associated with said selected spice is removable.

2. A spice rack in accordance with claim 1, further comprising a moveable member having an access opening therein, wherein the selector is used to select one of the receptacle holders and the moveable member is moved such that the access opening is adjacent the selected receptacle holder such that the receptacle in the selected receptacle holder can be removed from the housing.

3. A spice rack in accordance with claim 2, wherein the moveable member comprises a belt driveable by a drive motor such that the access opening aligns with one of the receptacle holders.

4. A spice rack in accordance with claim 3, wherein the housing includes an aperture in a front panel thereof and a portion of the belt is located adjacent the aperture such that the access opening is moveable to be aligned with one of the receptacle holders to allow the receptacle in that receptacle holder to be removed through the aperture.

5. A spice rack in accordance with claim 4, wherein the access opening is moveable to be either aligned with a first end of one of the receptacle holders or to be out of alignment with the elongate aperture such that none of the receptacles is accessible.

6. A spice rack in accordance with claim 5, wherein the aperture comprises an elongate aperture and the receptacle holders are arranged side by side within the housing such that the first ends thereof are all located adjacent the elongate aperture.

7. A spice rack in accordance with claim 6, wherein receptacles are received in the receptacle holders by sliding such that an upper end of the receptacle is located adjacent the first end of the receptacle holder and a lower end of the receptacle is located adjacent a second end of the receptacle holder remote from the first end.

8. A spice rack in accordance with claim 1, wherein the selector includes a display panel on which is displayed the list of spices available in the receptacles currently stored in the spice rack.

9. A spice rack in accordance with claim 8, wherein a communication port is provided such that the spice rack can be connected to further spice racks via the communication port and one of the control panels may be used to select receptacles stored in any of the spice racks.

10. A spice rack in accordance with claim 4, wherein the housing comprises a rectangular prism having an upper wall, a lower wall, a front wall, a rear wall and first and second side walls and the belt extends around the interior of the housing adjacent the front and rear walls and the first and second side walls.

11. A spice rack in accordance with claim 7, wherein the receptacle holders each comprises a frame having first and second ends corresponding to the first and second ends of the receptacle holder, the frame having a pair of rails on opposed longitudinal sides such that a side of the receptacle is slid between the rails until the lower end of the receptacle is adjacent an end stop provided adjacent the second end of the frame.

12. A spice rack in accordance with claim 11, wherein the receptacle holder includes an engagement mechanism to hold the receptacle when the receptacle is received into the receptacle holder.

13. A spice rack in accordance with claim 12, wherein the receptacle holder further comprises:
   an engagement clip extending from the end stop including a resilient member to press against the lower end of the receptacle;
   a lug provided on the engagement clip to engage with a corresponding recess in the lower end of the receptacle; and
   a tab adjacent the first end of the frame;
   wherein when the receptacle is inserted into the receptacle holder, the upper end of the receptacle is depressed downwardly to engage behind the tab adjacent the first end of the frame and pushing the upper end upwards to disengage it from the tab also disengages the lug from the recess in the lower end of the receptacle such that resilient member pushes the receptacle away from the end stop to protrude from the housing.

14. A spice rack in accordance with claim 13, wherein a bar member is provided including a plurality of engagement tabs located above each of the receptacle holders such that the engagement tabs engage with side surfaces of the receptacles on sides opposite the frame to aid in holding the receptacles in place in the receptacle holders.

15. A spice rack in accordance with claim 1, wherein one or more recipe lists are stored in memory, each recipe list containing a list of the spices required for a particular recipe such that selection of the recipe list from the selector causes the access opening to move sequentially to be adjacent each of the receptacles containing spices from the recipe list.

16. A spice rack in accordance with claim 1, wherein a sensing device is provided adjacent each receptacle holder such that the sensing device can detect the level of spice contained within the receptacle in the receptacle holder.

17. A spice rack in accordance with claim 16, wherein the sensing device comprises an emitter located on one side of the receptacle to direct a light beam through the receptacle and a light receiver on an opposite side of the receptacle positioned to receive the light beam.

18. A spice rack in accordance with claim 1, wherein a mounting bracket is provided for securing the housing to a surface.

19. A spice rack in accordance with claim 1, wherein each of the receptacles comprises a body and a cap being a rectangular prism shape with the cap on a longitudinal end thereof.

20. A spice rack in accordance with claim 19, wherein the caps each include a pivotable lid that can be pivoted to cover a plurality of holes in the cap.

21. A spice rack in accordance with claim 20, wherein the holes are provided in a pivotable portion that can be opened to provide a larger opening through which the spice can be accessed.

\* \* \* \* \*